R. J. LACKNER.
VEHICLE WHEEL.
APPLICATION FILED DEC. 31, 1919.

1,375,051. Patented Apr. 19, 1921.

Inventor:
Rolph J. Lackner.
by Lacey & Lacey Atty's

UNITED STATES PATENT OFFICE.

ROLPH J. LACKNER, OF NEW YORK, N. Y.

VEHICLE-WHEEL.

1,375,051. Specification of Letters Patent. Patented Apr. 19, 1921.

Application filed December 31, 1919. Serial No. 348,582.

*To all whom it may concern:*

Be it known that I, ROLPH J. LACKNER, a citizen of the United States, residing at New York, in the county of New York and State of New York, have invented certain new and useful Improvements in Vehicle-Wheels, of which the following is a specification.

This invention relates to improvements in vehicle wheels and more particularly to a wheel having novel means for preventing rim cutting of pneumatic tires.

An important object of this invention is to provide a wheel having an annular flange secured to its inner side and terminating inwardly of the tread of the tire so as to prevent the tire from breaking completely down as the result of a blow-out or puncture.

A further object of the invention is to provide a wheel having an outwardly projecting annular supporting flange arranged in spaced relation to the tire and terminating inwardly of the tread of the same so as to form a support to replace the tire when the same becomes deflated as the result of a puncture or blow-out.

A further object of the invention is to provide a device of the class described which is inconspicuous when applied and which is of highly simplified construction and cheap to manufacture.

Other objects and advantages of the invention will be apparent during the course of the following description.

Figure 1:
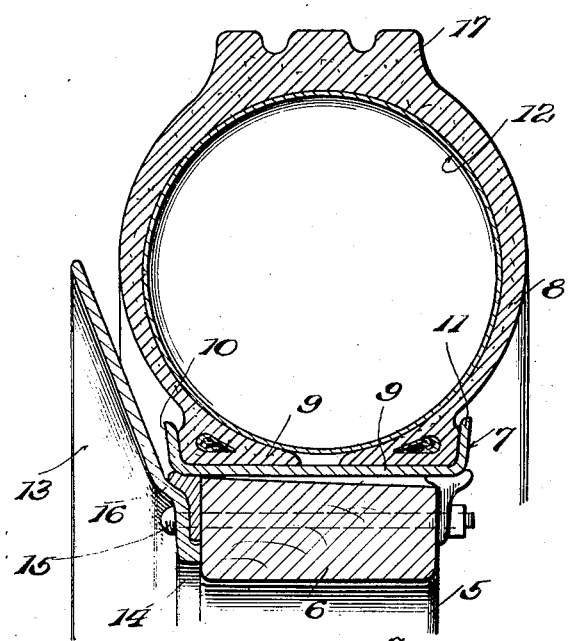
Figure 3:
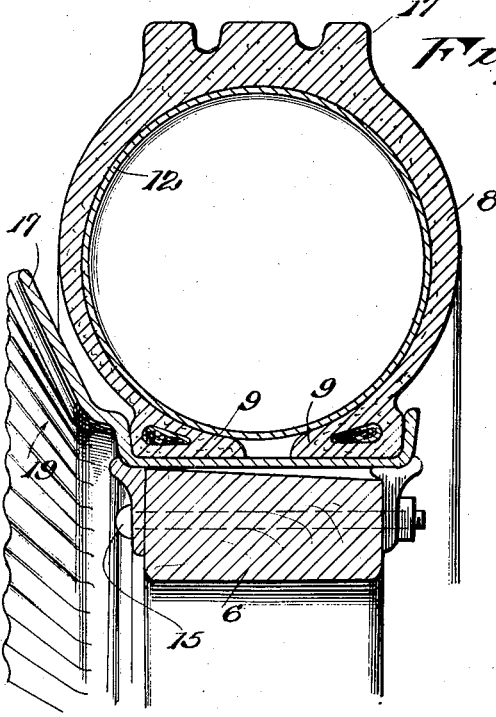
Figure 2:
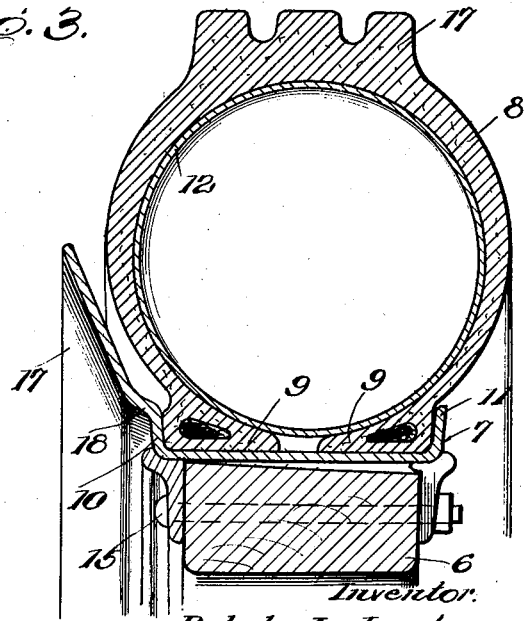

In the accompanying drawing, forming a part of this application and in which like numerals are employed to designate like parts throughout the same, Figure 1 is a detail transverse section through a wheel having the improved device and a tire applied thereto, Fig. 2 is a similar view illustrating a slightly modified form of the invention, Fig. 3 is a similar view illustrating a further modification of the invention.

In the drawing wherein for the purpose of illustration is shown several preferred embodiments of the invention, the numeral 5 designates a portion of a wheel having the usual felly 6 about which is arranged a detachable rim 7 adapted for supporting a tire shoe 8. The tire 8 is provided with circumferential beads 9 mounted on the body or annulus of the rim 7 and confined between outwardly projecting annular flanges 10 and 11. Within the shoe 8 is the usual inner tube 12 adapted for receiving air for inflating the tire.

When the tire loses its pressure as the result of a blow-out or leak, the same is pressed inwardly into engagement with the outwardly projecting flanges 10 and 11 which cut the tire on opposite sides and renders the same unfit for further use. If the wheel is used for any length of time with the tire deflated, the inner tube will also be cut into shreds and consequently rendered useless. To overcome this difficulty and to provide means for advising the operator of the vehicle to which the wheel is applied that the tire is deflated or partly deflated, I have provided an annular rim 13 which, as illustrated in the drawing, is provided with an annular attaching portion 14 arranged on the inner side of the felly and secured to the same by bolts 15. The annular flange 13 is offset as indicated at 16, adjacent its attaching portion so that the major portion of the flange is extended outwardly in spaced parallel relation to the adjacent side of the casing. The flange 13 terminates inwardly of the tread of the tire so that the same is normally out of contact with the ground. More specifically the annular flange 13 terminates midway between the beads 9 and the tread 17 so that the tire may freely cushion without interference from the flange.

When the tire is punctured, or is otherwise deflated, the weight of the vehicle presses the same inwardly and the periphery of the annular flange 13 engages the ground and prevents the casing of the tire from breaking down and resulting in the mutilation of the same and the inner tube. Also the flange 13 eliminates the necessity of again jacking up the car to its fullest extent since the tire is not allowed to entirely collapse. When desired skid chains may be applied to the wheel without removing the flange or without interference from the same.

In the form of the invention illustrated in Fig. 2, the inner flange 10 of the rim 7 is continued outwardly to form the supporting flange 17. The outer portion of the flange 10 is offset as indicated at 18, so as to arrange the annular member 17 in spaced relation to the adjacent side of the tire.

In the form of the invention illustrated in Fig. 3 the flange 17 is provided with a plurality of transverse corrugations 19 extending out through its outer end and adapted for strengthening and reinforcing the same.

In the manufacture of the device the same may be of any desired metal and, when applied, is arranged on the inner side of the wheel so as to be largely concealed from view and not to interfere with the application or removal of the tire. In carrying out the inventive idea involved, rims of either the clencher or straight-edge type may be employed. When skid chains are applied to the tire and flange illustrated in Fig. 3 is employed, the corrugations will serve to prevent undue circumferential movement of the chains with relation to the wheel. In other words, the corrugations 19 form a plurality of radial grooves within which the transversely extending chains of the skid chain are received so that the entire skid chain is prevented from undue circumferential movement with relation to the wheel. When the tire becomes deflated the operator of the vehicle will be immediately advised by the rough riding of the vehicle and the noise caused by the contact of the flange 13 with the ground.

It is to be understood that the forms of the invention herewith shown and described are to be taken as preferred examples of the same and that such minor changes in arrangement and construction of parts may be made as will remain within the spirit of the invention and the scope of what is claimed.

Having thus described the invention, what is claimed is:—

A wheel rim comprising an annulus, and a pair of tire receiving flanges formed along the edges of said annulus, one of said flanges being extended outwardly beyond the other flange and constituting an auxiliary supporting member, said auxiliary supporting member being provided with corrugations extending out through its outer side and forming a means for securing a skid chain against circumferential movement with relation to the wheel.

In testimony whereof I affix my signature.

ROLPH J. LACKNER. [L. S.]